Dec. 8, 1936.   H. F. FLOWERS   2,063,545
INDEPENDENT TRUCK ASSEMBLY FOR WHEEL VEHICLES
Original Filed June 6, 1932   4 Sheets-Sheet 1
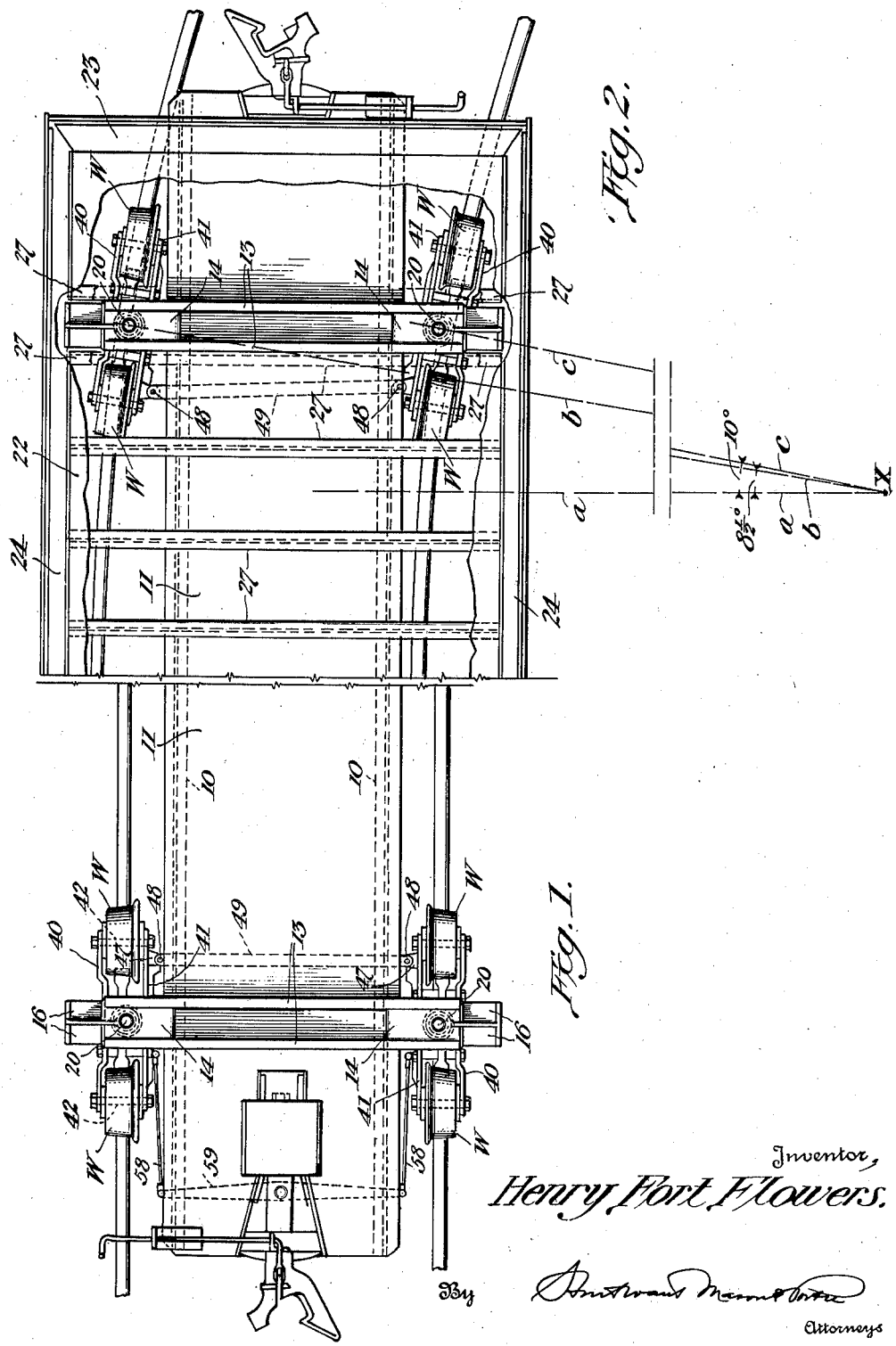
Inventor,
Henry Ford Flowers.
By
Attorneys Dec. 8, 1936.　　　　H. F. FLOWERS　　　2,063,545
INDEPENDENT TRUCK ASSEMBLY FOR WHEEL VEHICLES
Original Filed June 6, 1932　　4 Sheets-Sheet 2
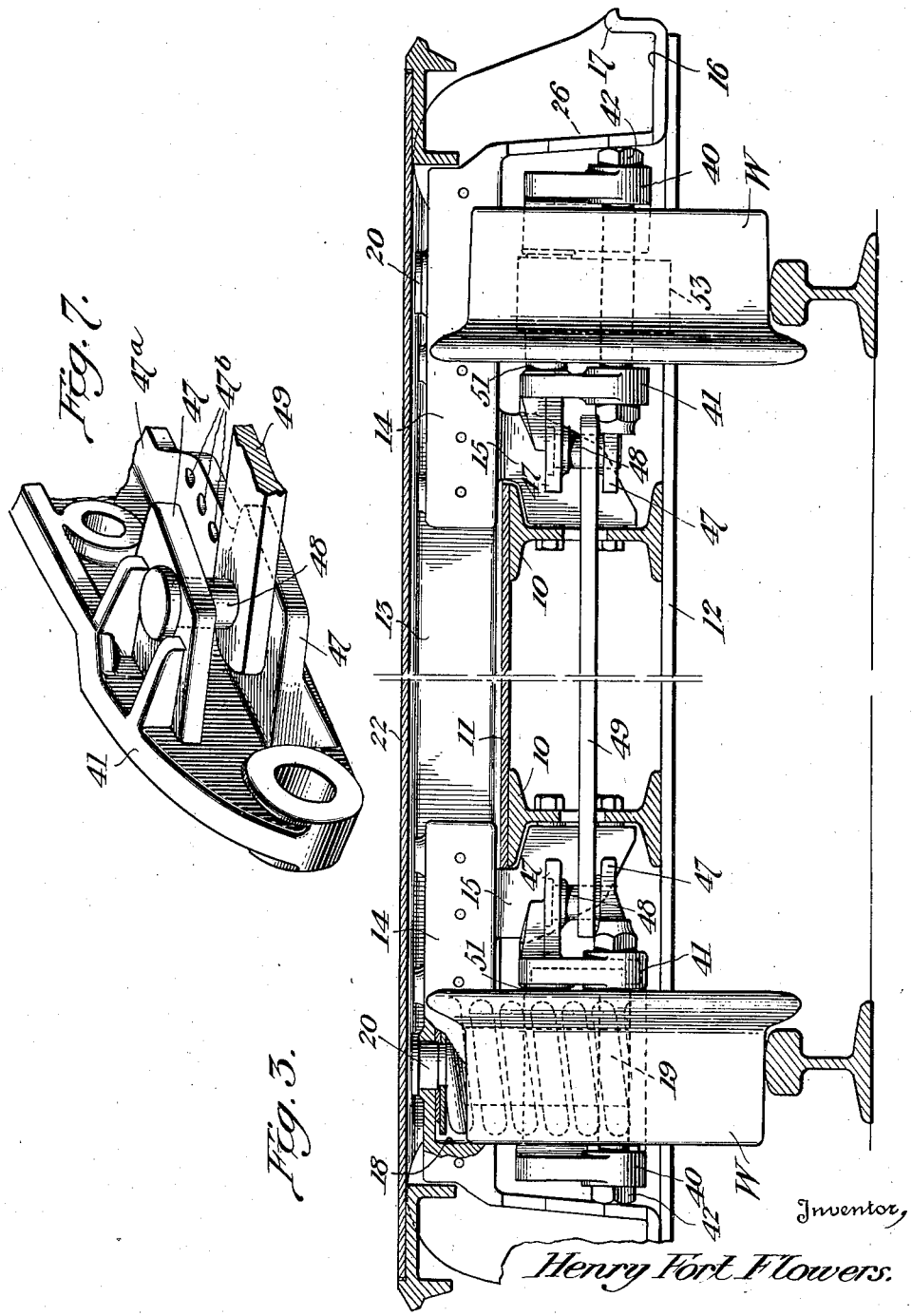
Inventor,
Henry Fort Flowers.
By
Attorneys Dec. 8, 1936.     H. F. FLOWERS     2,063,545
INDEPENDENT TRUCK ASSEMBLY FOR WHEEL VEHICLES
Original Filed June 6, 1932     4 Sheets-Sheet 3
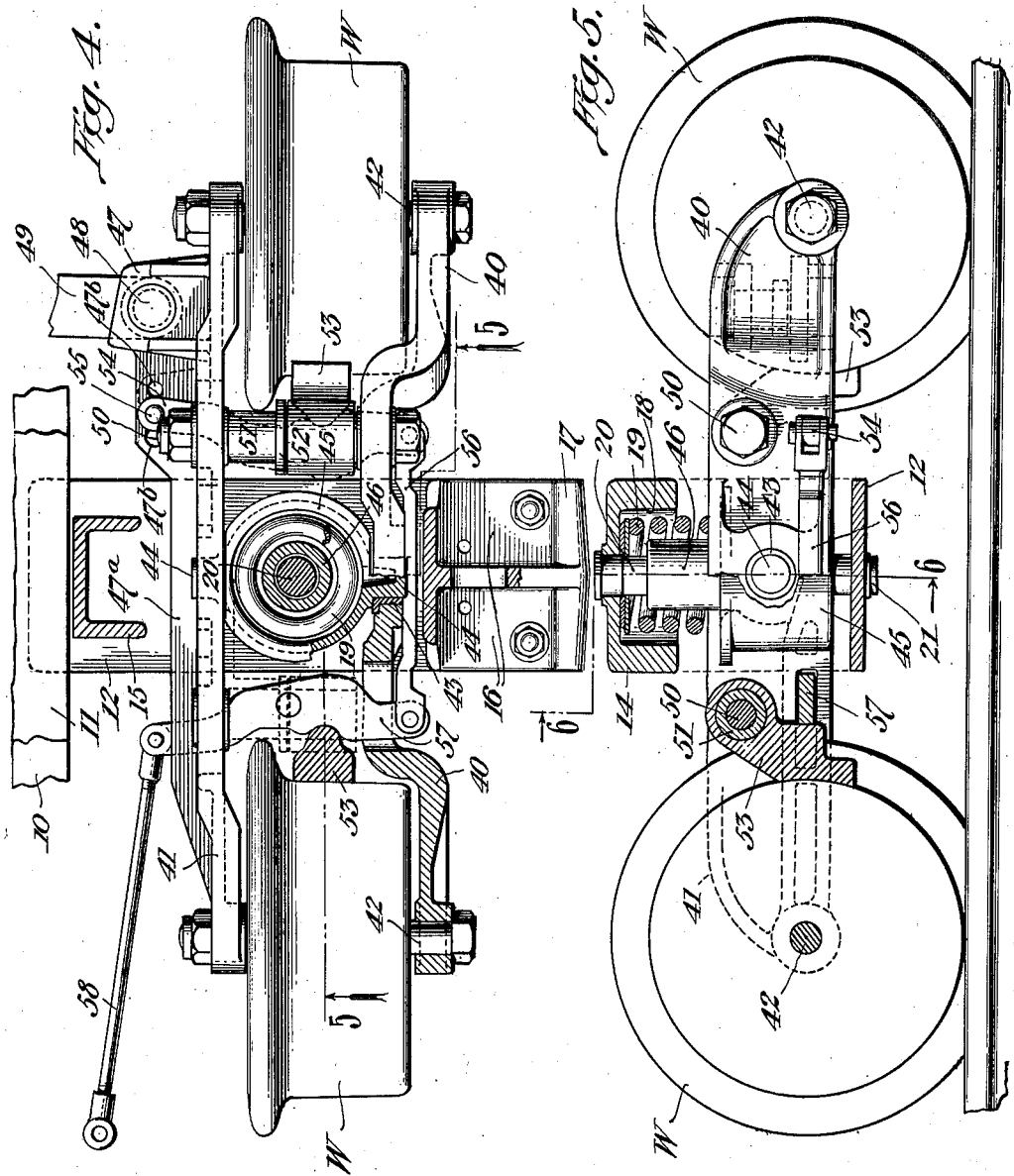
Inventor,
Henry Ford Flowers.
By Attorneys.

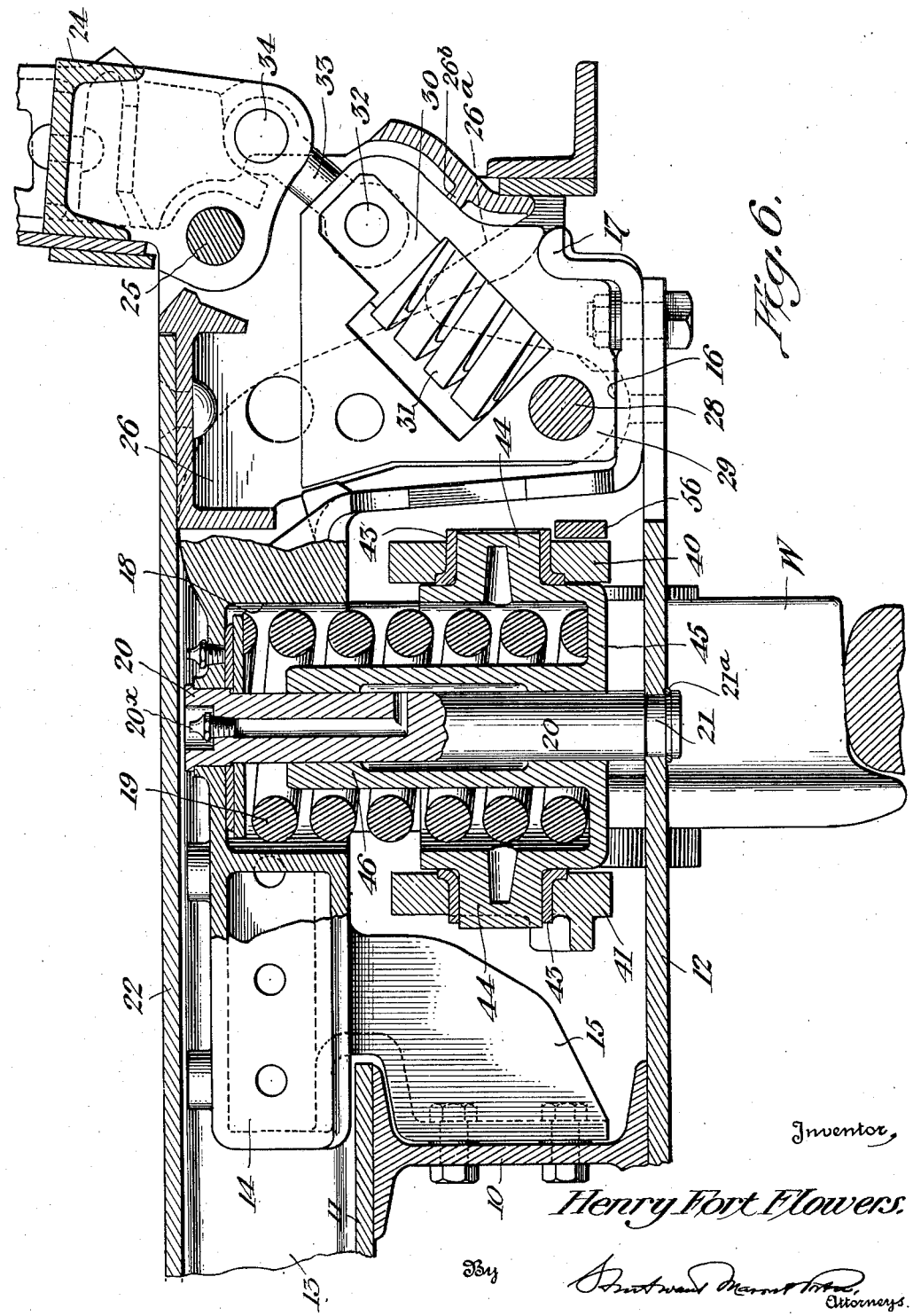

Patented Dec. 8, 1936

2,063,545

UNITED STATES PATENT OFFICE 2,063,545

INDEPENDENT TRUCK ASSEMBLY FOR WHEEL VEHICLES

Henry Fort Flowers, Findlay, Ohio

Application June 6, 1932, Serial No. 615,735
Renewed April 18, 1936

13 Claims. (Cl. 105—179)

This invention relates to improvements in trucks for vehicles, and more particularly concerns vehicles having independent trucks arranged in pairs with the members of each pair on opposite sides of the vehicle.

One of the features of the present invention is the provision of such a vehicle in which the pairs of independent trucks are connected by tie rods so that the trucks move through independent and predetermined angles as the vehicle passes around a curve.

Another feature of the present invention is the provision of independent trucks at the opposite sides of the vehicle, these trucks being interconnected so that they move in unison.

Another feature of the present invention is the provision of independent trucks at opposite sides of the vehicle, the trucks being independently mounted on the vehicle frame so that they may move upward and downward as the vehicle passes over irregularities of the route, such movement of one truck being independent of the compulsory movement of the other truck.

A further feature of the present invention is the provision of a vehicle having two pairs of trucks in which each pair comprises trucks located at opposite sides of the vehicle and connected together in pairs, so that the pairs of trucks move in unison as the vehicle passes around a curve, and each truck being independently supported on the vehicle frame so that it may move in a vertical direction independently of the other three trucks.

Still another feature of the present invention is the provision of independent car trucks having brake mechanisms located thereon, with the brake locks pivotally mounted on structural spacer members of the trucks, and with the brake actuating levers supported by the walls of slots in truck frame members and with one of the brake levers pivotally connected on a reinforcing shelf or ledge of one side frame member.

These and other objects of the present invention are set forth in the following specification and claims, in conjunction with the accompanying drawings in which an illustrative form of practicing the invention is set forth.

In these drawings:

Figure 1 is a plan view of a portion of a vehicle, with the body removed for clearness.

Fig. 2 is a similar plan view showing the position of a pair of trucks on a curve.

Fig. 3 is a transverse sectional view, on a larger scale.

Fig. 4 is a plan view of a truck, with part in section.

Fig. 5 is a side elevation view of the same, with part in section.

Fig. 6 is a transverse vertical section substantially on line 6—6 of Fig. 5.

Fig. 7 is a perspective view of one end of a truck frame, showing the connection of a tie rod thereto.

In the drawings, the vehicle is shown to comprise a frame including longitudinal center sills 10 having a top plate 11 thereon with transverse bottom straps 12 connected thereto and extending across the frame between the pairs of wheels of each pair of trucks. Above the plate 11, in transverse plane with the tie straps 12 are the channel irons 13 which receive the stirrup castings 14 at each side of the body. These stirrup castings have downwardly extending inner ends 15 which are connected to the center sills 10 (Fig. 6), and downwardly extending outer ends providing brackets which have supporting surfaces 16 for body pivoting and door actuating elements, and a lip 17 about which certain of said elements may rock as described hereinafter.

Each stirrup member 14 is likewise provided with walls forming a downwardly open cup 18 (Fig. 6) in which is received the upper end of truck spring 19, as well as with a seat for the king pin 20 of the truck which passes downwardly through the truck structure and has the end 21 supported in the transverse strap 12.

Upon the frame is mounted a body including a bottom 22 and end walls 23, with side doors 24. These side doors are mounted by pivots 25 upon castings 26 secured to the bottom member 22 of the body, and to the reinforcing irons 27 (Fig. 2) which pass from side to side of the body. The casting 26 at each truck is fulcrumed on a pin 28 which is supported by a rocker member 29 which normally rests on the floor 16 of the stirrup casting 14 (Fig. 6). A slider 30 is guided by ways provided in the rocker 29 and is constantly urged upward and outward by a spring 31 which reacts against the rocker 29. A pivot 32 on the slider 30 establishes a connection with the link 33 which is mounted on a pivot pin 34 of the door 24. The rocker 29 has a surface conforming to the lip 17.

Each truck comprises an outer truck member 40 and an inner truck member 41 (Figures 4 and 5) which at their ends support the axles 42 for the wheels W. Intermediate the ends (Figs. 4, 5 and 6) the frames 40 and 41 are provided with bushings 43 to receive the laterally extending pivot pins 44 of a pivot member 45 for the truck, which is provided with an annular chamber for the reception of the lower end of the truck spring 19, and with a centrally upstanding bearing portion 46 which surrounds the king pin 20 and turns thereon to permit the pivotal motion of the truck about a vertical axis. The king pin 20 will, of course, under load, move downward through the pivot member 45, and therefore, has a vertical movement relative to the truck. This pivot member 45 is, in effect, a body supporting member, as the body and its load is carried on the springs which are coaxial of the pivot post and which are supported by these body supporting members 45.

Each truck is provided adjacent one end thereof with ears 47 which are illustrated as formed integral with the inner truck frame member 41 (Fig. 7), and serve to receive the steering pin 48 which passes through the tie rod 49. This tie rod extends across the vehicle, through the frame thereof (Fig. 3), whereby to connect together the two trucks in each pair. It will be noted that the pivot pins 48 are offset inwardly toward the longitudinal central plane of the car from the positions of the king pins 20, so that the tie rod has a lesser length between the axes of the pivot pins 48 than the axial distance between the king pins 20, in the form of construction shown, where the tie rods 49 are located adjacent the middle of the length of the car.

The trucks are likewise represented as provided with connecting bolts 50 which extend between the frame members 40, 41 and securely position these frames at predetermined distances, by the employment of the spacing collars 51 (Figs. 4 and 5). These spacing collars are provided with annular shoulders 52 to prevent axial movement of the pivoted brake blocks 53 which may bear against the wheels W. These connecting bolts 50, together with the spacing collars 51 form a rigid connection between the frame members 40 and 41, which connection is located between the pivotal center of the truck and the wheels. In this type of truck where the stub axle is used, the thrust on the flange of the wheel in passing around curves or through switches, exerts a very severe torsional twist on the axle. The rigid connection between the frame members will hold said frame members from movement relative to each other and thus maintain the stub axles horizontal and parallel to each other. This greatly aids in maintaining a uniform distribution of thrust on the axle.

The inner frame member 41 has the lower ear 47 extended as a shelf 47a (Figs. 4 and 7) and is provided with a plurality of apertures 47b. A brake lever 54 is connected at its inner end to a pivot 55 which may be engaged (Fig. 4) in any one of the apertures 47b, so that adjustment of the position of this brake lever is possible in order to compensate for wear of a brake block. The brake lever 54 extends transversely through slots in the side frame members 41, 40, and is connected at its outer end by a pivoted link 56 with a second brake lever 57 which likewise passes through slots in the side frame members 40, 41 and is pivotally connected at its inner end with a brake link 58 which leads to an equalizer brake beam 59 (Fig. 1) which may be operated in any desired manner. The brake lever 57 may be adjusted in position by rotation of the brake link 58 which has right and left threads thereon for the purpose. The brake blocks 53 (Fig. 5) thus engage with the bearing surfaces of the wheels W, and are independently pivoted on the spacer collars 51 at a point horizontally removed from the bearing surface, so that they may fall by gravity as the trucks are released. The brake levers 54, 57 engage behind the brake blocks, and upon tension on the brake link 58, the lever 57 is moved in a counterclockwise direction about its pivot connection to the intermediate link 57, turning about its brake block 53 as a fulcrum, so that it exerts a compression upon the intermediate link 56, and thus causes a counterclockwise rocking of the brake lever 54, which in its turn forces its brake block 53 against the right hand wheel (Figs. 4 and 5). Thus the braking effort is distributed between the two wheels. It will be noted that with this type of construction, the brake blocks, as well as the brake levers, are identical in shape, and few parts are required.

In operation, with the body in horizontal position as shown in Fig. 6, the vehicle may be loaded with any desired material and transported to a discharge point. At the discharge point, the body is tilted with respect to the frame, in any desired manner, wherewith the body bottom 22 and its rigidly joined casting 26 pivot about the fulcrum pin 28. The rocker 29 remains in position upon the floor 16, so that the door pivot 25 moves in a circular arc about the axis of fulcrum pin 28, while the door actuating pivot 34 tends to move relatively away from the position of the axis of pivot pin 32, whereby a tension is created in link 33 to open the door 24 relative to the body 22. Any outward pressure upon the door 24 in the position of Fig. 6, however, as might be exerted by a blow from a steam shovel bucket against the inner face of door 24 results in a compression through link 33 which is absorbed by spring 31.

If the tilting of the body bottom 22 continues beyond the point at which the casting 26 is engaged with lip 17 (it being cut away as shown at 26a to permit the aforesaid tilting of the body), then the body fulcrums further about the lip 17, the casting 26 and the rocker 29 turning together for this part of the movement.

Upon the return of the body bottom 22 toward the position shown in Fig. 6, the link 33 operates in compression to close the door 24. This type of construction of the car, with the controlled door, is described and claimed in my co-pending application Ser. No. 579,540 filed Dec. 7, 1931.

The axes of the pivot pins 28, 32, 34 are not in line, the intermediate pivot pin 32 being slightly below the line joining the centers of pins 38 and 34 so that a toggle effect is produced, and the rocker 29 has a tendency toward clockwise rocking movement about the pivot 28 under the urgency of spring 31. Thus when the car body is tilted in the opposite direction, so that the right hand side, as shown in Fig. 6 is raised away from the supporting surface 16, this toggle effect holds the door 24, at this side, closed; while the rocker 29 is limited in this rocking movement by engagement with a stop 26b formed on the casting 26 (Fig. 6).

As the vehicle moves from one point to another over inequalities of the route whereby the supporting points for the pairs of wheels of a truck are not in line parallel to the longitudinal direction of the body, the wheels and side frames may fulcrum about the pivots 44 to compensate for such irregularity. This occurs independently in each truck so long as the pivots 44 of all trucks remain in the same plane. If, however, the route is so irregular that the wheels of one truck are not supported at the same level as the wheels of the other three trucks, the wheels tend by gravity to follow the route, and by reaction through the truck spring 19 tend to support a portion of the weight of the vehicle and its load, the springs of the other three trucks adjusting themselves to the new condition. It is thus obvious that the vehicle conforms to the road bed over which it travels, regardless of the irregularities thereof.

If the vehicle is caused to turn in direction, the pairs of trucks at opposite sides of the vehicle turn together. Thus, with a rail vehicle as illustrated, when the extreme upper right hand wheel in Fig. 2 first encountered the curved track, its flange was forced relatively downward, the flange of the left hand wheel of this truck serving as a fulcrum so that the upper king pin 20 in Fig. 2 was moved inward, causing the frame and body of the vehicle to swing relatively downward in the figure. At the same time, the upper truck in Fig. 2 by tension through the tie rod 49 has also served to cause a relative clockwise rotation of the lower truck about its king pin 20, so that the two trucks are brought into position to follow the curves of the track.

Owing to the aforesaid relationship of axial distances of the king pins 20 and of the tie rod and steering pivot pins 48, the trucks swing through different angles. Thus in Fig. 2 the line $a$ is at right angles to the longitudinal axis of the vehicle. The line $b$ is at right angles to the upper truck, and the line $c$ is at right angles to the line of the lower truck. It will be noted that the angle between lines $a$ and $b$ may be for example 8½ degrees while the angle between lines $a$ and $c$ may be 10 degrees. In each instance, the distance between the steering pins 48 is so selected with respect to the distance between king pins 20 that the trucks are each parallel to the chord of the track beneath them, or in other words, the general center X (Fig. 2) at which the lines $a$, $b$ and $c$ intersect is also the center of curvature of the two rails.

The structure thus assembled has a very low height from the top of the rail to the upper surface of the body bottom 22 (Fig. 3), being only sufficiently greater than the height of the top of the wheel flanges from the top of the rail to permit the desired amount of relative sliding movement between the truck pivot journal portion 46 and the king pin 20. In the particular form of construction shown, the tie rods 49 are located at the adjacent ends of the pairs of trucks, since thereby they are more protected, and are not in the way of any coupling or brake mechanism; but it will be understood that this is not a limitation upon the invention as set forth in the claims.

The truck assembly thus composed may be easily dismounted without the use of expensive equipment, by removing the time members 12 after releasing the split rings 21a at the lower ends 21 of the king pins 20. The raising of the car body then frees the truck and its spring, so that it may be entirely removed. The king pins, if worn may be readily withdrawn by raising the corresponding side of the car body, whereby free access to the upper ends of the king pins is obtained. In the illustrated form, the upper ends of the king pins are recessed to provide protection for lubricating devices 20x which communicate through passages with the annular space left within the bearing member 46 and around the king pin; these lubricating devices 20x being readily accessible whenever the car body is tilted with respect to the frame.

The king pins 20 are illustrated (Figs. 1 and 2) as being located directly above the rails, in a vertical horizontal plane of the trucks which contains the line of tractive effort of the wheels while rolling a brake, so that the trucks are, so to speak, balanced with respect to the king pins 20 during movement on straight tracks, and thus the tie rods 49 are substantially freed of strains under such conditions.

It is obvious that the invention may be modified in many ways without departing from the scope of the appended claims.

Having thus described the invention, what I claim as new and desire to secure by Letters Patent, is:

1. A truck assembly for a vehicle having a king pin and a support therefor, comprising a truck pivot member having an upwardly open annular cup portion with a central bearing sleeve surrounding the king pin and slidable and rotatable thereon, truck side frames mounted intermediate their length on horizontal pivots of said truck pivot member, wheels pivoted at the ends of said side frames, and a spring interposed between said support and the bottom of said annular cup portion.

2. A truck assembly for a vehicle having a frame, comprising a pair of truck side frames, longitudinally spaced wheels journaled on transverse horizontal axes at the ends of said frames, a truck pivot member having transverse horizontal pivot portions engaged with transversely aligned intermediate portions of said side frames, spacer members located between said side frames and intermediate the wheels and pivot members, bolts for holding said side frames against said spacer members, a king pin fixedly secured to the vehicle frame and passing through said pivot member whereby the pivot member may rotate about and slide along said king pin, and a spring surrounding said king pin and interposed between said pivot member and the vehicle frame.

3. A truck assembly for a vehicle comprising a pair of truck side frames, longitudinally spaced wheels journaled at the ends of said frames, a truck pivot member having horizontal pivot portions engaged with intermediate portions of said side frames, spacer members located between said side frames intermediate the wheels and the pivot member, bolts for holding said side frames against said spacer members, brake blocks pivotally mounted on said spacer members, and means supported by said frame for moving the brake blocks against said wheels.

4. A truck assembly for a vehicle having a frame, comprising a pair of truck side frames, longitudinally spaced wheels journaled on transverse horizontal axes at the ends of said frames, a truck pivot member having transverse horizontal pivot portions engaged with transversely aligned intermediate portions of said frame, said truck pivot member having a recess in its upper face extending below the axes of the pivots and adapted to provide a seat for a spring, said pivot member having a central bearing sleeve extending above the pivot portions, a king pin fixedly secured to the vehicle frame and passing through said sleeve, and a spring surrounding the king pin and said sleeve and interposed between said pivot member and the vehicle frame.

5. A vehicle including in combination, a body frame, opposed king pins rigidly connected to said frame at opposite sides thereof, a truck associated with each king pin, each truck including spaced side frames, a stub axle attached to said frames adjacent each end thereof, said stub axles being rigidly connected to the frames and horizontally disposed therein, a wheel supported on each stub axle, the side frames of each truck being connected at points between the pivotal center thereof and the wheels for forming a rigid truck unit, wherein the stub axles are maintained parallel and horizontal under lateral thrust load on the rim of the wheels, a body frame supporting member mounted between the truck frames on which said truck frames may oscillate about a horizontal axis, said body frame supporting member being mounted on said king pin so as to oscillate about a vertical axis and so that said king pin may move bodily vertically relative to the body frame supporting member, a spring seat on the body frame, a spring seat on the body frame supporting member, and a spring coaxial with the king pin and contacting with said spring seats.

6. A vehicle including in combination, a body frame, opposed king pins rigidly connected to said frame at opposite sides thereof, a truck associated with each king pin, each truck including spaced side frames, a stub axle attached to said frames adjacent each end thereof, said stub axles being rigidly connected to the frames and horizontally disposed therein, a wheel supported on each stub axle, the side frames of each truck being connected at points between the pivotal center thereof and the wheels for forming a rigid truck unit wherein the stub axles are maintained parallel and horizontal under lateral thrust load on the rim of the wheels, a body frame supporting member mounted between the truck frames on which said truck frames may oscillate about a horizontal axis, said body frame supporting member being mounted on said king pin so as to oscillate about a vertical axis and so that said king pin may move bodily vertically relative to the body frame supporting member, a spring seat on the body frame adjacent the upper end of the king pin, a spring seat on the body frame supporting member disposed below the horizontal axis on which the truck oscillates, and a spring coaxial with the king pin and contacting with said spring seats.

7. A vehicle including in combination, a body frame, opposed king pins rigidly connected to said frame at opposite sides thereof, a truck associated with each king pin, each truck including spaced side frames, a stub axle attached to said frames adjacent each end thereof, said stub axles being rigidly connected to the frames and horizontally disposed therein, a wheel supported on each stub axle, the side frames of each truck being connected at points between the pivotal center thereof and the wheels for forming a rigid truck unit wherein the stub axles are maintained parallel and horizontal under lateral thrust load on the rim of the wheels, a body frame supporting member mounted between the truck frames on which said truck frames may oscillate about a horizontal axis, said body frame supporting member being mounted on said king pin so as to oscillate about a vertical axis and so that said king pin may move bodily vertically relative to the body frame supporting member, a spring seat on the body frame adjacent the upper end of the king pin, a spring seat on the body frame supporting member disposed below the horizontal axis on which the truck oscillates, and a spring coaxial with the king pin and contacting with said spring seats, said body supporting member having a portion extending above said spring seat thereon and having a sliding connection with the king pin whereby said body supporting member is restrained from lateral tilting movement.

8. A vehicle including in combination, a body frame, opposed king pins rigidly connected to said frame at opposite sides thereof, a truck associated with each king pin, each truck including a frame, horizontally disposed stub axles attached to said frame adjacent each end thereof, and a wheel supported on each stub axle, said stub axles being rigidly connected to said truck frame and said truck frame being of rigid construction whereby the stub axles are maintained parallel and horizontal under lateral thrust load on the rim of the wheels, a body frame supporting member mounted between the wheels on the truck frame on which said truck frame may oscillate about a horizontal axis, said body frame supporting member being mounted on said king pin so as to oscillate about a vertical axis and so that said king pin may move bodily relatively vertically of said supporting member, a spring seat on the body frame, a spring seat on the body supporting member, and a spring co-axial with the king pin and contacting with said spring seats.

9. A vehicle including in combination, a body frame, opposed king pins rigidly connected to said frame at opposite sides thereof, a truck associated with each king pin, each truck including a frame, horizontally disposed stub axles attached to said frame adjacent each end thereof, and a wheel supported on each stub axle, said stub axles being rigidly connected to said truck frame and said truck frame being of rigid construction whereby the stub axles are maintained parallel and horizontal under lateral thrust load on the rim of the wheels, a body frame supporting member mounted between the wheels on the truck frame on which said truck frame may oscillate about a horizontal axis, said body frame supporting member being mounted on said king pin so as to oscillate about a vertical axis and so that said king pin may move bodily relatively vertically of said supporting member, a spring seat on the body frame adjacent the upper end of the king pin, a spring seat on the body frame supporting member disposed below the horizontal axis on which the truck oscillates, and a spring co-axial with the king pin and contacting with the spring seats.

10. A vehicle including in combination, a body frame, opposed king pins rigidly connected to said frame at opposite sides thereof, a truck associated with each king pin, each truck including a frame, horizontally disposed stub axles attached to said frame adjacent each end thereof and a wheel supported on each stub axle, said stub axles being rigidly connected to said truck frame and said truck frame being of rigid construction whereby the stub axles are maintained parallel and horizontal under lateral thrust load on the rim of the wheels, a body frame supporting member mounted between the wheels on the truck frame on which said truck frame may oscillate about a horizontal axis, said body frame supporting member being mounted on said king pin so as to oscillate about a vertical axis and so that said king pin may move bodily relatively vertically of said supporting member, a spring seat on the body frame adjacent the upper end of the king pin, a spring seat on the body frame supporting member disposed below the horizontal axis on which the truck oscillates, and a spring contacting with the spring seats, said body supporting member having a sliding connection with the king pin whereby said body supporting member is restrained from lateral tilting movement.

11. A vehicle including in combination, a body frame, opposed king pins rigidly connected to said frame at opposite sides thereof, a truck associated with each king pin, each truck including a frame, horizontally disposed stub axles attached to said frame adjacent each end thereof, and a wheel supported on each stub axle, said stub axles being rigidly assembled with said truck frame and said truck frame being of rigid construction whereby the stub axles are maintained parallel and horizontal under lateral thrust load on the rim of the wheels, a body frame supporting member mounted between the wheels on the truck frame on which said truck frame may oscillate about a horizontal axis, said body frame supporting member being mounted on said king pin so as to oscillate about a vertical axis and so that said king pin may move bodily relatively vertically of said supporting member, and means adjacent the king pin for cushioning the bodily vertical movement of said supporting member relative to said king pin.

12. A vehicle including in combination, a body frame, opposed vertically extending members rigidly connected to said frame at opposite sides thereof, a truck associated with each of said members, each truck including a frame, a wheel mounted adjacent each end of said frame, said truck frame being of rigid construction whereby the axes of rotation of said wheels are maintained parallel under lateral load thrust on the wheels, a body frame supporting member mounted between the wheels on the truck frame on which said truck frame may rock in a vertical plane, said body frame supporting member being mounted on said vertically extending member so as to have a vertical sliding engagement therewith and so as to oscillate about the vertical axis thereof, and means adjacent the vertically extending member for cushioning the vertical sliding movement of said body supporting member relative to said vertically extending member.

13. A vehicle including in combination, a body frame, opposed vertically extending king pins rigidly connected to said frame at opposite sides thereof, a truck associated with each king pin, each truck including a frame, horizontally disposed stub axles mounted on said truck frame adjacent each end thereof, a wheel supported on each truck axle, each truck frame being of rigid construction whereby the stub axles are maintained parallel under lateral load thrust on the wheels, a body supporting member mounted between the wheels of the truck frame on which said truck frame may rock in a vertical plane, said body supporting member being mounted on said king pin so as to have a vertical sliding engagement therewith and so as to oscillate about the vertical axis thereof, and means adjacent the king pin for cushioning the vertical sliding movement of said body supporting member relative to said king pin.

HENRY FORT FLOWERS.